Aug. 14, 1928.
G. W. YANSS
1,680,928
AUTOMOBILE BUMPER BRACKET
Filed Nov. 30, 1926
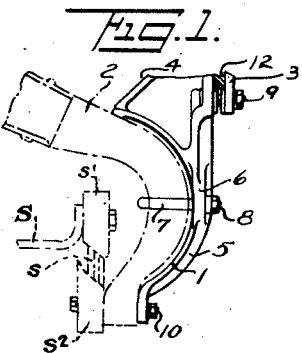
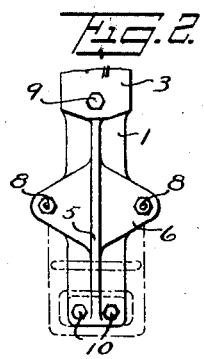
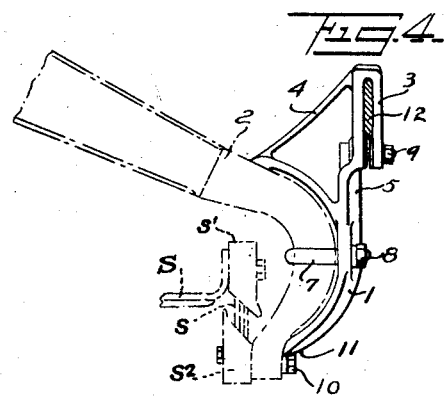
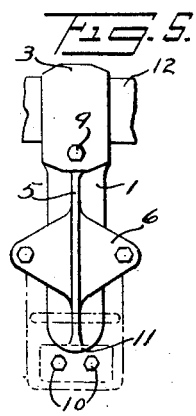
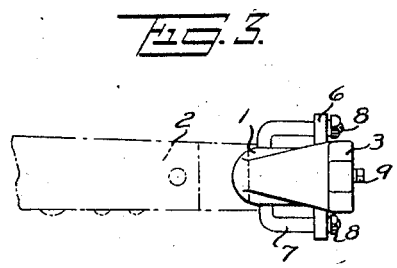
INVENTOR
George W. Yanss.
BY
Frederick P. Duncan, ATTORNEY Patented Aug. 14, 1928.

1,680,928

UNITED STATES PATENT OFFICE.

GEORGE W. YANSS, OF BRIDGEPORT, CONNECTICUT, ASSIGNOR TO AMERICAN CHAIN COMPANY, INC., A CORPORATION OF NEW YORK.

AUTOMOBILE BUMPER BRACKET.

Application filed November 30, 1926. Serial No. 151,617.

This invention relates to bumper brackets for automobiles of the type in which the frame carrying the body of the car is provided with a downwardly extending and forwardly curved horn, the lower end of which is supported from a vehicle spring by means of a flexible fabric shackle.

It is an object of this invention to provide a bracket adapted to be attached readily to such a horn without drilling or special machining operations, and which is designed to co-operate with the shackle bolts provided on such a horn for attachment of the shackle.

A clear conception of the construction and further objects of the invention may be had from the following specification in conjunction with the accompanying drawings in which:

Fig. 1 discloses in side elevation, the preferred form of bracket embodying the invention shown in place upon a horn.

Fig. 2 is a front view of Fig. 1.

Fig. 3 is a plan view of the bracket.

Fig. 4 is a side elevation of a modified form of the invention, and

Fig. 5 is a front view of Fig. 4.

The now preferred form of the invention as shown in Figs. 1 and 2 comprises an arc-shaped base 1, of the same curvature as the horn, 2, having a clamp 3, with a bolt 9 to hold a bumper bar 12 and having a bracing member 4, formed on its upper rear portion to rest upon the upper surface of the horn. The base plate 1 has a reinforcing rib 5, with a diamond-shaped plate 6 extending laterally therefrom. The plate 6 has two holes in its outer vertices through which a U-shaped bolt 7 is connected after passing around the horn by means of nuts 8. In this type of automobile chassis the horn 2 is connected with, and supported from, the body spring S by means of a flexible fabric shackle comprising a fabric portion $s$ and clamps $s^1$ and $s^2$, the former secured to the spring and the latter bolted at 10 to the horn. In pursuance of the invention the lower end of base 1 is formed at an angle conforming to the lower end of the horn as shown, and two slotted holes are provided therein in alignment with the shackle bolts 10 by which it is further fastened to the horn, thus providing for cooperation by the shackle securing means in effecting firm support of the fender bracket.

A modified form of the bracket similar to the one described is shown in Figs 4 and 5. The only material difference is the omission of the angular portion at the bottom of base 1. In this particular form of bracket, the base 1 ends in a shoulder 11 which is adapted to be tucked in above the shackle bolts 10, and wedge between the latter and the swell of the horn 2 when the U-bolt 7 is tightened.

Both forms of bracket above described constitute secure fastenings for bumpers when used on an automobile having a horn shaped as illustrated and flexible fabric spring shackles bolted in a manner similar to that disclosed.

I claim—

1. A bumper bracket for automobiles of the type in which the frame has a curved horn connected with a vehicle spring by a flexible fabric shackle bolted to the free end of said horn, said bracket comprising a base shaped to conform with and rest on the upper curved surface of said horn, and means for connecting said base to said horn in co-operation with said spring shackle bolt.

2. A bumper bracket for automobiles of the type in which the frame has a curved horn connected with a vehicle spring by a flexible fabric shackle bolted to the free end of said horn, said bracket comprising a base shaped to conform with and rest on the upper curved surface of said horn, an upright with a clamping means for a bumper member as a part of said base, and means for connecting said base to said horn in co-operation with said spring shackle bolt.

3. A bumper bracket for automobiles of the type in which the frame has a curved horn connected with a vehicle spring by a flexible fabric shackle bolted to the free end of said horn, said bracket comprising a base shaped to conform with and rest on the upper curved surface of said horn, a portion of said base being adapted to be tucked in between the spring shackle bolt and the swell of said horn, an upright as a part of said base with a clamping means thereon for a bumper member, and a U-shaped bolt for connecting said base to said horn.

4. A bumper bracket for automobiles of the type in which the frame has a curved horn connected with a vehicle spring by a flexible fabric shackle bolted to the free end of said horn, said bracket comprising a base shaped to conform with and rest on the upper curved surface of said horn, an upright as a part of said base with a clamping means thereon for a bumper member, a U-shaped bolt for connecting said base to said horn, and an end portion of said base being adapted to be engaged with said shackle bolt, so that the shackle bolt co-operates in holding the bracket firmly against displacement In testimony whereof, I have signed this specification.

GEORGE W. YANSS.